US012548429B2

(12) United States Patent
Menard et al.

(10) Patent No.: US 12,548,429 B2
(45) Date of Patent: Feb. 10, 2026

(54) INTELLIGENT EMERGENCY RESPONSE FOR MULTI-TENANT DWELLING UNITS

(71) Applicant: Alarm.com Incorporated, Tysons, VA (US)

(72) Inventors: Jed Menard, Littleton, CO (US); Alexander Kappler, Arlington, VA (US); John Murdock, Arlington, VA (US); Jasper Bingham, Washington, DC (US); Gustaf Nicolaus Maxwell Lonaeus, Washington, DC (US); Kyle Rankin Johnson, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 48 days.

(21) Appl. No.: 18/763,589

(22) Filed: Jul. 3, 2024

(65) Prior Publication Data

US 2025/0006035 A1 Jan. 2, 2025

Related U.S. Application Data

(63) Continuation of application No. 18/108,318, filed on Feb. 10, 2023, now Pat. No. 12,033,492, which is a (Continued)

(51) Int. Cl.

| | |
|---|---|
| ***G08B 25/00*** | (2006.01) |
| ***G08B 17/10*** | (2006.01) |
| ***G08B 17/12*** | (2006.01) |
| ***G08B 25/10*** | (2006.01) |
| ***G08B 29/18*** | (2006.01) |
| ***G08B 31/00*** | (2006.01) |

(52) U.S. Cl.

CPC ........... *G08B 25/006* (2013.01); *G08B 17/10* (2013.01); *G08B 17/125* (2013.01); *G08B 25/10* (2013.01); *G08B 29/188* (2013.01); *G08B 31/00* (2013.01)

(58) Field of Classification Search

CPC .... G08B 25/006; G08B 17/10; G08B 17/125; G08B 25/10; G08B 29/188; G08B 31/00

See application file for complete search history.

(56) References Cited

U.S. PATENT DOCUMENTS

| | | | | |
|---|---|---|---|---|
| 7,683,793 | B2 | 3/2010 | Li et al. | |
| 7,880,604 | B2 * | 2/2011 | McKenna | G08B 21/12 340/506 |

(Continued)

*Primary Examiner* — John A Tweel, Jr.

(74) *Attorney, Agent, or Firm* — Fish & Richardson P.C.

(57) ABSTRACT

Methods and systems including computer programs encoded on a computer storage medium, for receiving, for a multi-tenant dwelling unit (MDU), a map of the MDU, where the map includes locations corresponding to multiple sensors at the MDU and defines multiple sub-areas of the MDU, receiving sensor data from one or more sensors of the plurality of sensors, where the sensor data is indicative of a fire event at the MDU, determining, from the sensor data, one or more sub-areas of the multiple sub-areas included in the fire event, generating, based on the sensor data, a targeted fire event response for the one or more sub-areas of the multiple sub-areas of the MDU, and providing, to the one or more sub-areas of the multiple sub-areas, the targeted fire event response.

20 Claims, 4 Drawing Sheets

Related U.S. Application Data continuation of application No. 17/467,819, filed on Sep. 7, 2021, now Pat. No. 11,580,843.

(60) Provisional application No. 63/075,387, filed on Sep. 8, 2020.

(56) References Cited

U.S. PATENT DOCUMENTS

| | | | | |
|---|---|---|---|---|
| 9,980,112 | B1 | 5/2018 | Newby et al. | |
| 10,380,863 | B2 * | 8/2019 | Wedig | G08B 17/06 |
| 10,514,264 | B2 | 12/2019 | Correnti et al. | |
| 10,650,626 | B2 | 5/2020 | Shadid et al. | |
| 10,805,786 | B2 | 10/2020 | Pellegrini et al. | |
| 10,970,995 | B2 | 4/2021 | Tani et al. | |
| 11,019,458 | B2 | 5/2021 | Viton et al. | |
| 11,037,067 | B2 | 6/2021 | Holliday et al. | |
| 11,143,521 | B2 | 10/2021 | Correnti et al. | |
| 11,580,843 | B2 * | 2/2023 | Menard | G08B 25/10 |
| 12,033,492 | B2 * | 7/2024 | Menard | G08B 17/125 |
| 2005/0190053 | A1 | 9/2005 | Dione | |
| 2008/0062167 | A1 | 3/2008 | Boggs et al. | |
| 2011/0163872 | A1 | 7/2011 | Pasveer et al. | |
| 2011/0195687 | A1 | 8/2011 | Das et al. | |
| 2011/0276264 | A1 | 11/2011 | Plocher et al. | |
| 2013/0169817 | A1 | 7/2013 | Jones et al. | |
| 2016/0049064 | A1 | 2/2016 | McNabb et al. | |
| 2017/0032632 | A1 | 2/2017 | Joseph et al. | |
| 2018/0158315 | A1 | 6/2018 | Sloo et al. | |
| 2018/0204428 | A1 | 7/2018 | Asaro et al. | |
| 2018/0356241 | A1 | 12/2018 | Correnti et al. | |
| 2020/0240802 | A1 | 7/2020 | Correnti et al. | |
| 2021/0398434 | A1 | 12/2021 | Madden et al. | |
| 2022/0036722 | A1 * | 2/2022 | Greenwood | G08B 27/001 |
| 2022/0148393 | A1 | 5/2022 | Shen et al. | |

* cited by examiner

INTELLIGENT EMERGENCY RESPONSE FOR MULTI-TENANT DWELLING UNITS

CROSS-REFERENCE TO RELATED APPLICATIONS

This application is a continuation of U.S. application Ser. No. 18/108,318, filed Feb. 10, 2023, which is a continuation of U.S. application Ser. No. 17/467,819, filed Sep. 7, 2021, now U.S. Pat. No. 11,580,843, issued Feb. 14, 2023, which claims the benefit of U.S. Application 63/075,387, filed on Sep. 8, 2020. The disclosure of each of the foregoing applications is incorporated herein by reference.

TECHNICAL FIELD

This disclosure relates generally to emergency response systems.

BACKGROUND

Multi-tenant dwelling units (MDUs) pose challenges for emergency responders in case of fire or another hazardous situation due to unknowns of location and intensity of the hazards. Emergency response systems can be installed in MDUs to respond to fires or other hazardous situations that affect the MDU, but a response from the emergency response system may cause extensive damage, e.g., water damage from a sprinkler system, beyond what is needed to put out the fire.

SUMMARY

Techniques are described for a targeted response system utilizing multi-modal sensor data and video analytics for detecting, monitoring, and responding with a targeted response to hazardous situations in multi-tenant dwelling units (MDUs).

More specifically, techniques are described for targeted response system utilizing smart analytics and distributed internet-of-things (IoT) sensors to detect, monitor, and respond to localized emergencies in real-time. A map of the MDU can be provided by a resident/manager of the MDU, including locations of the different residences/designate different types of rooms (e.g., kitchen, bedroom, hallway, bathroom, common area, etc.), as well as locations of multiple sensors, e.g., smoke detectors, cameras, contact sensors, IoT-enabled devices, etc. Sensor data from the multiple sensors can be collected to detect and validate an emergency event e.g., a fire. A targeted response, e.g., a targeted fire event response, can be coordinated for the validated emergency event utilizing the map of the MDU and real-time sensor data, such that the response is targeted to only a particular sub-area of the MDU that has an associated risk above a threshold. The targeted response can include drone deployment to the emergency event, emergency responders, and or localized systems response, e.g., sprinkler systems. Real-time data from the sensors, drone, etc., can be aggregated to populate the map provided to emergency responders, residents of the MDU, or other interested parties. Though described herein in particular as a targeted response system to fire events (e.g., referred to as "targeted fire event response"), other hazard responses are considered, e.g., flood, biohazard, carbon monoxide or other dangerous chemical/gas exposure, etc.

In general, one innovative aspect of the subject matter described in this specification can be embodied in methods that include receiving, for a multi-tenant dwelling unit (MDU), a map of the MDU, where the map includes locations corresponding to multiple sensors at the MDU and defines multiple sub-areas of the MDU, receiving sensor data from one or more sensors of the multiple sensors, where the sensor data is indicative of a fire event at the MDU, determining, from the sensor data, one or more sub-areas of the multiple sub-areas included in the fire event, generating, based on the sensor data, a targeted fire event response for the one or more sub-areas of the multiple sub-areas of the MDU, and providing, to the one or more sub-areas of the multiple sub-areas, the targeted fire event response.

Other embodiments of this aspect include corresponding systems, apparatus, and computer programs, configured to perform the actions of the methods, encoded on computer storage devices. In some implementations, other embodiments of this aspect include a monitoring system configured to monitor a property including multi-tenant dwelling units (MDUs), and including a plurality of sensors located at the property and configured to collect sensor data, and one or more computers and one or more storage devices storing instructions that are operable, when executed by the one or more computers, to cause the one or more computers to perform the actions of the methods.

These and other embodiments can each optionally include one or more of the following features. In some implementations, providing the targeted fire event response includes determining occupancy states of each of the multiple sub-areas, where determining an occupancy state for a sub-area includes collecting sensor data from a subset of sensors located at the sub-area, and determining, from the collected sensor data, an occupancy confidence score, generating a real-time fire event map based on occupancy confidence scores, and providing to one or more users, the real-time fire event map.

In some implementations, determining the occupancy state for the sub-area includes receiving cellular tower data corresponding to one or more cellular devices associated with a sub-area or receiving security system alarm status data for a security system associated with the sub-area, and determining, from the cellular tower data or the security system alarm status data, the occupancy confidence score.

In some implementations, providing the targeted fire event response further includes providing, to one or more user devices associated with each of the multiple sub-areas, an alert based on the determined occupancy states of each of the multiple sub-areas.

In some implementations, the sub-areas include apartment housing.

In some implementations, the methods further include receiving one or more states of doors associated with the multiple sub-areas, and determining, based on the sensor data and the one or more states of doors associated with the multiple sub-areas, a predicted spread of the fire event. Determining the predicted spread of the fire event can further include receiving locations of fire-preventative measures in the multiple sub-areas, determining one or more room types of the one or more sub-areas included in the fire event, and determining, from the locations of the fire-preventative measures and the one or more room types of the one or more sub-areas, a likelihood of spread of the fire event based on the one or more room types of each of the one or more sub-areas included in the fire event.

In some implementations, generating the targeted fire event response includes selecting, based in part on the determined one or more room types of each of the one or more sub-areas, a particular targeted fire event response of multiple targeted fire event responses.

In some implementations, the targeted fire event response includes determining a subset of sprinklers of multiple sprinklers located at the MDU and within a threshold area surrounding the fire event, and activating the subset of sprinklers.

In some implementations, the targeted fire event response includes deploying a drone to the one or more sub-areas of the multiple sub-areas of the MDU included in the fire event, and receiving, from the drone and collected by an onboard sensor on the drone, additional sensor data. Receiving sensor data from one or more sensors of the plurality of sensors can include receiving sensor data from a first sensor of a first sensor type and a second sensor of a second, different sensor type.

In some implementations, providing the targeted fire event response includes determining occupancy states of each of the multiple sub-areas, where determining an occupancy state for a sub-area includes receiving, from the sub-areas, an arming state of a security system for the sub-area, and determining, based on the arming state of the security system, a likelihood that the sub-area is occupied.

In some implementations, the methods further include determining, from sensor data collected from a first sensor and a second sensor, a confidence score for the fire event, and in response to determining that the confidence score meets a threshold, validating the fire event.

Implementations of the described techniques may include hardware, a method or process implemented at least partially in hardware, or a computer-readable storage medium encoded with executable instructions that, when executed by a processor, perform operations.

The techniques described in this disclosure provide one or more of the following advantages. By collecting sensor data from multiple sensors located throughout the MDU, a real-time understanding of the risk level of the hazard can be determined. Using sensor data from multiple sensors can additionally be used to validate the hazard, e.g., a fire, with an assigned confidence level to determine an appropriate response to the hazard, e.g., whether or not the hazard is real and how best to respond to it. Moreover, sensor data from multiple sensors, e.g., door locks, contact sensors, etc., located throughout the MDU can be used to predict a spread of the hazard throughout sub-areas of the MDU, e.g., different apartments, in order to target specific areas with an emergency response, e.g., activating a particular subset of sprinklers. A real-time map of the premises can be updated with sensor data and may provide emergency responders a better understanding of the locations/risk level of the hazards and residents in need to target their response.

In some implementations described herein, drones or other forms of autonomous/semi-autonomous response can be used to provide first responder assistance as well as additional on-site sensor data, e.g., video data, to enhance the multiple sensors of the MDU.

The details of one or more implementations are set forth in the accompanying drawings and the description below. Other features will be apparent from the description and drawings, and from the claims.

DETAILED DESCRIPTION

Techniques are described for a targeted response system utilizing multi-modal sensor data and video analytics for detecting, monitoring, and responding with a targeted response to hazardous situations in multi-tenant dwelling units (MDUs). Though described herein in the context of multi-tenant dwelling units, other residential/commercial applications are possible. For example, single-family dwellings, neighborhoods, commercial office buildings, schools, and the like, can all implement similar targeted response systems.

Figure 1:
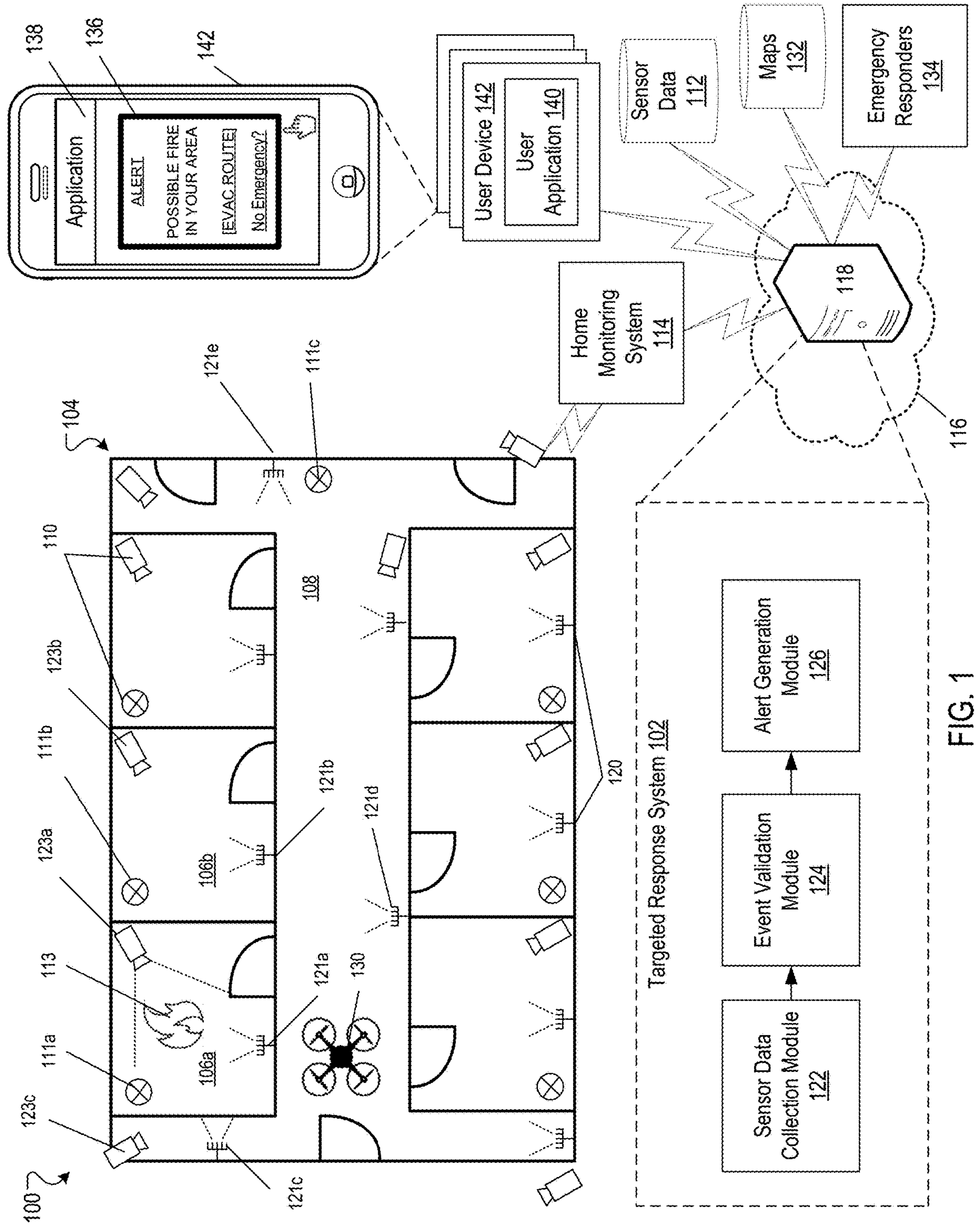
FIG. 1 is an example operating environment for a targeted response system.

FIG. 1 is an example operating environment 100 for a targeted response system 102. A multi-tenant dwelling unit (MDU) 104 can include multiple sub-areas 106*a*, 106*b*. Each sub-area 106*a* can be a separate residence or commercial space, e.g., a different apartment, townhouse, business, etc., that shares a common area 108, e.g., shared hallways, staircases, lobby, entrances/exits, etc. Each residence or commercial space of the MDU can be further divided into respective sub-areas, e.g., rooms within an apartment. Sub-areas 106*a*, 106*b* can each have a respective smart home system including a hub, e.g., a home monitoring system 114, where the respective home monitoring systems 114 from each sub-area 106*a,b* can be connected to a same service provider. Data collected, e.g., by sensors, smart appliances, user devices, etc., by each home monitoring system 114 can be shared over a network 116 to a centralized service provider which may utilize the collected data to monitor and respond to events 113, e.g., fires, occurring in the MDU 104.

Sub-areas 106*a*, 106*b* and common area 108 can include multiple sensors 110 that each collect respective sensor data 112 representative of a state of the sub-area 106*a*, 106*b* in which the particular sensor 110 is located. Sensors 110 can include smoke detectors, carbon monoxide detectors, heat sensors, cameras, door locks, contact sensors, internet-of-things (IoT)-enabled smart appliances, glass break sensors, water sensors, or the like. Each sensor 110 can generate respective sensor data 112, e.g., imaging data for a camera. Sensors 110 can be in data communication with a home monitoring system 114 and the targeted response system 102 via a network 116. Network 116 can include one or more servers 118 that can host the home monitoring system 114 and targeted response system 102.

Network 116 can be configured to enable exchange of electronic communication between devices connected to the network 116. The network 116 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL), radio, television, cable, satellite, or any other delivery or tunneling mechanism for carrying data. Network 116 may include multiple networks or subnetworks, each of which may include, for example, a wired or wireless data pathway. Network 116 may include a circuit-switched network, a packet-switched data network, or any other network able to carry electronic communications (e.g., data or voice communications). For example, network 116 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. Network 116 may include one or more networks that include wireless data channels and wireless voice channels. Network 116 may be a wireless network, a broadband network, or a combination of networks includes a wireless network and a broadband network.

MDU 104 can further include automated/semi-automated emergency response systems, e.g., sprinkler system 120. Sprinkler system 120 can include multiple distributed sprinklers 121*a-e* located in different sub-areas 106*a*, 106*b* and/or common area 108. Each sprinkler 121*a-e* can be activated individually or in tandem with other sprinklers 121*a-e*. For example, sprinklers 121*a* and 121*b* can be activated to provide a flow of a flame-retardant (e.g., water, argon gas, etc.) while sprinklers 121*c*, 121*d*, and 121*e* remain off. Selection of particular sprinklers 121*a-e* of the sprinkler system 120 to activate is discussed below with reference to FIG. 3.

In some implementations, sensors 110 include detectors 111*a*, 111*b*. Detectors 111*a*, 111*b* can detect one or more of smoke, carbon dioxide, carbon monoxide, heat, or the like. Detectors 111*a, b* can be operable to provide sensor data 112 to home monitoring system 114 and/or targeted response system 102. Additionally, detectors 111*a,b* can be operable to provide audible/visual alerts, e.g., a high pitched alarm or flashing lights, to persons located nearby/within the MDU, e.g., to residents of the MDU or to emergency responders.

In some implementations, sensors 110 include a camera system. Camera system includes multiple cameras 123*a-c*, where each camera captures at least a portion of a sub-area 106*a*, 106*b* and/or common area 108 within a field of view of the camera.

Each sub-area 106*a* and common area 108 of the MDU 104 can include a set of sensors 110 and sprinklers for a sprinkler system 120. In one example, a sub-area 106*a* includes a smoke detector 111*a*, camera 123*a*, and sprinkler 121*a*. In another example, common area 108 includes sprinklers 121*c-e*, cameras, e.g., camera 123*c*, and smoke detector 111*a*.

Targeted response system 102 includes sensor data collection module 122, event validation module 124, and alert generation module 126. Though described herein with reference to sensor data collection module 122, event validation module 124, and alert generation module 126, the actions can be performed by more or fewer modules. The sensor data collection module 122 can receive sensor data 112 from multiple different sensors 110 associated with the MDU 104.

Sensor data collection module 122 can receive, from multiple sensors 110, sensor data 112 as input. Sensor data 112 can be requested by the sensor data collection module 122 and/or a sensor 110 can push sensor data 112 to the sensor data collection module, for example, at periodic intervals. For example, sensor data collection module 122 can request updated sensor data 112 from the sensor 110 at a periodic interval, e.g., every 15 minutes, every 5 minutes, every hour, etc. In another example, the sensor 110 can provide updated sensor data 112 to the sensor data collection module 122 at a periodic interval, e.g., every 10 minutes, every 30 minutes, etc.

In some implementations, sensors 110 can provide sensor data 112 in response to determining an occurrence of an event 113, e.g., a fire or other hazardous situation. For example, a smoke detector 111*c* can detect the presence of a threshold amount of smoke in the air surrounding the smoke detector 111*c* and provide sensor data 112 including the detection to the sensor data collection module 122.

In some implementations, the sensor data collection module 122 can request sensor data 112 from one or more particular sensors 110 in response to an occurrence of an event 113. For example, the sensor data collection module 122, can receive sensor data 112 from camera 123*c* which can include the occurrence of an event 113, e.g., a possible fire, and in response request sensor data 112 from other sensors, e.g., smoke detectors 111*b*, 111*c*.

The sensor data collection module 122 can aggregate the sensor data 112 from multiple sensors 110 including metadata for the respective sensor data 112, e.g., time/date of the data, the particular sensor 110 that generated the sensor data, location of the particular sensor. The aggregated sensor data 112 can be linked to a particular event 113, e.g., a possible fire or other hazardous event 113, where the sensor data 112 from each respective sensor 110 can be tagged with the event 113. The aggregated sensor data can be provided by the sensor data collection module 112 as output to the event validation module 124.

The event validation module 124 can receive the aggregated sensor data 112 as input and validate the occurrence of the event 113. Validation of the event 113 can include utilizing data analytics, e.g., image processing, object/human recognition, etc., to determine that the event 113 is occurring, e.g., that a candle fire has gotten out of control. In some implementations, validation of the event 113 can include comparing sensor data 112 from a first sensor 110, e.g., smoke detection data from smoke detector 111*a*, with sensor data from a second sensor 110, e.g., imaging data from a camera 123*a* within a sub-area 106*a* of the MDU 104. For example, event validation module 124 can validate a positive smoke detection by smoke detector 111*a* by performing image processing on imaging data received from camera 123*a*, e.g., determining that the imaging data includes fire, smoke, or the like.

In some implementations, event validation module 124 can determine a reliability of the collected sensor data 112 as evidence of an event 113 occurring. A measure of confidence can be applied to the collected sensor data 112. In other words, a confidence score can be applied to the sensor data 112 collected from a sensor 110 or aggregated sensor data 112 from multiple sensors 110 that reflects a confidence that an event 113, e.g., a fire or other hazard, is occurring. Confidence scores can include, for example, a rating on a scale, e.g., 1-10, or a rating of high/medium/low. In one example, sensor data 112 from a camera 123*a* depicting a fire that is not determined to be in a fireplace can be assigned a high confidence score that the sensor data 112 depicts an event 113. In another example, sensor data from a camera 123*b* depicting a fire that is determined to be localized to a burning candle can be assigned a low confidence score that the sensor data 112 depicts an event 113.

In some implementations, an event 113 is assigned a confidence score, in other words, a confidence that the event 113 is actually occurring. In one example, an event 113 that is represented by aggregated sensor data 112 from a smoke detector 111*a* and sensor data 112 from a camera 123*a*, each of which that indicates a fire event 113, may be assigned a confidence score of high that the event 113 is occurring. In another example, an event 113 that is represented by aggregated sensor data 112 from a smoke detector 111*a* which indicates a fire event 113 and a camera 123*a* which indicates no fire event 113 may be assigned a confidence score of low that the event 113 is occurring.

In some implementations, an assigned confidence score can depend in part on a type of sensor data 112 used to determine the confidence score. The confidence score can be weighted based in part on a type of sensor 110 that has generated the sensor data 112, e.g., imaging data from a camera 123*a* can be weighed more heavily than smoke detector data from a smoke detector 111*a*. In one example, if a smoke detector indicates a potential event 113 but the camera indicates no event 113, the confidence score assigned to the event 113 may be low.

In some implementations, an assigned confidence score can depend in part on a validation by another source other than the sensors 110 that have generated sensor data 112. In one example, data collected by a drone 130 and/or human validation by a human expert can be used to assign or adjust the confidence score generated by the event validation module 124. For example, in response to the detection of a possible event 113, a drone 130 can be deployed to a location of the event 113, e.g., based on a location of the one or more sensors 110 that have detected the event 113. Data generated by the drone 130, e.g., imaging data, thermal imaging data, or the like, can be utilized by the event validation module 124 to validate the event 113, assign or adjust a confidence score for the event 113, or the like. A human expert can review sensor data 112 from the sensors 110 and/or data generated by the drone 130 of the event 113 to validate the event 113 and/or assign/adjust the confidence score for the event 113.

In some implementations, each sensor 110 contributes to an overall confidence score for an event, where sensors that are detecting the event will add to the confidence score and sensors that are not detecting the event will subtract from the confidence score. Different device types may have different weightings towards an overall confidence score. For example, a stronger weighting can be given to a camera than a smoke detector, such that a camera reporting a fire with high confidence may be only minimally counteracted by a smoke detector reporting no fire. A total confidence score can be calculated even when sensors contradict each other, and contradictory reporting by multiple sensors can result in triggering an event threshold. Contradictory data can be verified by a human operator, e.g., a property manager and/or first responder, to determine why contradictory data is being reported with respect to an event.

In some implementations, multiple confidence scores can be assigned to an event 113 based on a location within the MDU 104. In other words, a high confidence score can be assigned to a zone where sensor data 112 confirms flames and smoke, and a medium confidence score can be assigned to a medium confidence zone, e.g., the area surrounding the high confidence zone, where sensor data 112 confirms only smoke but no flames is collected. Assigning different confidence scores to different zones within the MDU 104 can be utilized to localize an area affected by the event 113.

In some implementations, an event 113 can be assigned a risk score or a severity rating. The risk score, e.g., high/medium/low or 1-10, can be indicative of how dangerous the event 113 is. The risk score can be assigned, for example, utilizing one or more pre-trained machine learned models that receive the aggregated sensor data 112 and generate a risk score as output. In one example, a risk score of high can be assigned to an event 113 (also referred to within as a "fire event") that includes sensor data 112 collected from multiple sub-areas 106 in the MDU 104 where sensor data 112 from sensors 110 in multiple sub-areas 106 are indicative of the event 113, e.g., a fire that has spread into multiple sub-areas (e.g., multiple apartments). For example, two adjacent apartments can be determined to be included in the fire event based on sensor data collected from sensors located within the two adjacent apartments. In another example, a risk score of low can be assigned to an event 113 that includes sensor data 112 collected from multiple sub-areas 106 in the MDU 104 where sensor data 112 from only a particular sensor 110 of multiple sensors 110 is indicative of the event 113, e.g., smoke from a microwave in an apartment.

In some implementations, the event validation module 124 can predict a spread of a validated event 113, e.g., a potential spread of a fire in an MDU 104. The event validation module 124 can access one or more maps 132 of the MDU 104, e.g., a first map depicted the layout of the MDU 104 and a second map depicted each sub-area 106 of the MDU 104, which can be generated, for example, by a building owner or builder.

In some implementations, a map or set of maps 132 of the MDU 104 can be set up by owners, property managers, builders, etc. and can include physical locations of each sub-area 106 and locations of the sensors 110. A user can provide labels of sub-areas 106, objects of interest, sensors 110, etc., e.g., identifying a room as a kitchen can alert the system of higher risk areas. The user may also designate spaces as different types of rooms, e.g., "kitchen," "bathroom", etc. The user may additionally set up the map 132 to include locations of the various sensors 110, (e.g., locations of fire detectors, motion sensors, electronic door locks, etc.), the locations of the doorways, hallways, stairwells, elevators, etc. Map 132 can further include safety features of the MDU including fire walls, fire doors, fire escapes, and the like.

The event validation module 124 can utilize the maps 132 and the aggregated sensor data 112 for the validated event 113 to predict the spread of the event 113 based on pre-trained machine-learned models. The pre-trained machine-learned models can receive the maps 132 and aggregated sensor data 112 from the sensors 110 as input and provide, as output, a forecast of where/when/how the event 113 is likely to spread. In one example, the pre-trained machine-learned model can determine, based on a presence of a fire-door and/or fire wall between sub-area 106*a* and sub-area 106*b* of the MDU 104, that the event 113 is unlikely to spread past the fire-door and/or fire wall but will likely spread to a common area 108. In another example, a first type of room can be a kitchen, which may be more likely to spread a fire event (e.g., given accessibility of a fuel source such a gas line) versus a second, different type of room can be a bathroom, which may be less likely to spread a fire event.

The event validation module 124 can provide confirmation of the validated event 113 as output to the alert generation module 126. The alert generation module 126 can receive the confirmation of the validate event 113, e.g., including a confidence score, risk score, and prediction of likely spread, and generate a coordinated event response, e.g., a targeted fire event response, as output. For example, an event is a fire event and a coordinated event response is a targeted fire event response to the fire event, including one or more actions described below.

A coordinate response can include, for example, response by emergency responders 134, and one or more alerts 136 provided to end-users, e.g., residents, property managers, or other interested parties. For example, an alert 136 can be provided to residents of sub-areas where at least a threshold occupancy confidence score is determined. In other words, sub-areas which are likely to have people present within can receive alerts 136.

In some implementations, alert generation module 126 can generate an alert 136 to display in an application environment 138 of an application 140 on a user device 142. In one example, an application 140 is a home monitoring system application for a home monitoring system 114. Alert 136 can be displayed as a pop-up alert on the user device 142. In some implementations, alert 136 can be a text/SMS-based notification. Alert 136 can include information related to the event 113, e.g., "possible fire in your area," and can link/display evacuation routes in the MDU 104 for the user. Alert 136 can additionally include a user-feedback option, where a user can report the notification, e.g., "No emergency," and/or call emergency responders, e.g., automatically dial 9-1-1.

In some implementations, a coordinated response can include audio/visual alerts, e.g., flashing lights, sirens, etc., on the user devices 142 and/or using distributed emergency alert systems in the MDU 104, e.g., fire alarms. For example, an audio/visual alert can be an activation of an emergency siren system in the MDU. In another example, an audio/visual alert can be an alarm in a home monitoring system 114 for one or more of the sub-areas, e.g., apartments, of the MDU 104.

In some implementations, the alert generation module 126 generates a coordinated response including emergency responders 134. A coordinated response including emergency responders 134 can include providing to the emergency responders a map 132 of the MDU 104 including real-time sensor data 112. The real-time validated sensor data 112, e.g., imaging data, smoke detection data, etc., can be utilized to develop real-time understanding by the targeted response system 102 of the containment/spread of the event 113, occupancy states of sub-areas, emergency routes, and the like. The real-time understanding can be incorporated into an interactive map 132 that can be displayed on a user device 142 of an emergency responder 134.

In addition to sensor data 112, additional data can be incorporated into the real-time understanding of the event 113, e.g., to determine locations of users and occupation states of different sub-areas. In some implementations, additional data can include arming states of security systems, geolocation data from user devices 142, data from smart appliances, data from smart HVAC systems, user devices 142 connected to a local network or Wi-Fi, etc. Cellular tower data can be utilized to determine real-time occupancy of the MDU 104. For example, an amount of data transfer from devices associated with a sub-area (e.g., data usage for mobile phones belonging to known occupants of an apartment) can be utilized to determine if one or more residents of a sub-area are located at the sub-area.

In some implementations, occupancy states of the different sub-areas can be determined and an occupancy confidence score can be assigned to each sub-area 106*a, b*. For example, a sub-area 106*a* which is actively transmitting/receiving cellular tower data can be assigned a high occupancy confidence score indicating that it is likely to have residents present. In another example, a sub-area 106*b* where the security system is activated or set to "away" mode (i.e., if the security system is in an armed or disarmed state) may be assigned a low occupancy confidence score indicating that it is unlikely to have residents present.

In some implementations, occupancy state of each sub-area in the MDU 104 can be determined when the event is validated. Sensor data 112 can be collected, e.g., smart locks, imaging data, smart appliance data, etc., from each of the sub-areas that include a high occupancy confidence score, to determine a set of sub-areas that are likely occupied during the event. In one example, data provided by an IoT-based sensor system, e.g., a home security system, can be used to provide information to emergency responders 134 about which rooms of a single family home may be occupied. Moreover, door sensor data from particular rooms determined to be occupied can be utilized to determine if the occupants have left the residence.

An alert 136 can be provided to user devices 142 associated with the sub-areas that are determined to be likely occupied, e.g., user devices belonging to tenants/owners/residents of the sub-areas. Information related to sub-areas that are determined to be likely occupied can be provided to additional users, e.g., emergency responders 134, as a list of high-priority sub-areas 106 to check and evacuate.

In some implementations, the targeted response system 102 can track a number of people believed to be in each residence before an alert 136 is provided, for example looking at the CO2 content of the air which is correlated with the number of occupants, or leveraging video-based person detection, and a number can be provided to emergency responders 134 or other interest parties for verifying that the same number of people who had been inside a sub-area have now left.

In some implementations, the targeted response system 102 can generate a coordinated response that includes activating one or more counter-measures. Counter measures can include, for example, a sprinkler response of one or more of the sprinklers 120 in the MDU and/or a deployment of drones 130.

In some implementations, a sprinkler response includes selectively activating select sprinklers 120 to target sub-areas 106 that are included within a threshold radius/area of the event 113, e.g., a sub-area 106*a* and additional areas surrounding sub-area 106*a* that are within a threshold radius. For example, sprinklers 121*a-d* can be activated while sprinkler 121*e* is left off. Predictive modeling, e.g., using pre-trained machine-learning models, can be utilized to determine vulnerability of the areas surrounding the event 113, e.g., whether a fire is likely to spread into certain areas of the MDU. Based on the predictive modeling, the targeted response system 102 can activate the sprinklers 120 in areas based on reliability of the data collected in those areas, e.g., high confidence score in particular areas can result in an activation of sprinklers 120 in the particular areas.

In some implementations, map 132 including sensor data 112 and locations of the sprinklers 120 can be utilized by the predictive modeling to generate a selective sprinkler response. The sprinklers 120 can be remotely activated by the targeted response system 102 or manually activated, e.g., by a human operator. Sprinklers 120 can collect sensor data, e.g., temperature data using a temperature gauge or infrared camera, and a sprinkler 120 can automatically be activated when a measured temperature meets a threshold temperature, e.g., the sprinkler can automatically turn on when the temperature is measured above 150° F.

In some implementations, an amount of flame retardant, e.g., water, argon, or the like, distributed at each sprinkler 120 can be adjusted based in part on a risk score for the sub-area including the particular sprinkler 120. For example, a sprinkler 120 located in a same sub-area as the fire can receive a larger amount of water versus a sprinkler 120 located in a sub-area that is further away from the fire.

The targeted response system 102 may continue to collect sensor data as input and provide alerts and counter measures as output so long as the event 113 is determined to be occurring, e.g., as long as the system 102 determines a fire is present. The targeted response system 102 may adjust a confidence score and/or risk score based on collection of updated sensor data 112, e.g., a fire spreading or getting larger can cause the risk score to become more severe, and can respond by generating a different alert and/or selecting different counter measures, e.g., activating additional sprinklers 120.

In some implementations, a targeted fire event response can include multiple confidence score thresholds each to trigger a particular targeted fire event response, e.g., to send alerts to different users depending on a certainty that an event is occurring. In one example, if a confidence that an event is occurring is low-to-moderate certainty, a notification can be sent to residents of the MDU but not to emergency responders. In another example, if a confidence that an event is occurring is high, a notification can be sent to residents of the MDU and to emergency responders.

In some implementations, a targeted fire event response can include one or more actions performed by a drone 130 deployed at the MDU to provide, for example, another source of validation for an event 113 and/or localized counter measures. For example, a drone can include a camera that can be positionable to capture a possible location of the event 113 and can further include a flame retardant reservoir, e.g., a fire extinguisher, to target the event 113.

Drones 130 can be fireproof or fire-resistant and equipped to operate under hazardous conditions, e.g., can maneuver around hazards. Drones 130 can be equipped with sensors, e.g., infrared cameras, smoke detectors, temperature gauges, etc., for gathering information about the fire event 113, and/or be equipped with fire prevention/response measures including, for example, firefighting tools, e.g., fire blanket, fire extinguishers, masks, etc. The drones can be remotely controlled and/or automated to target fires, recognize objects in order to identify issues, e.g., recognize locations of humans, pets, etc., and can pass information collected to the targeted response system 102 or local firefighting personnel via the network 116, e.g., via Wi-Fi, Bluetooth, or another form of wireless communication.

In some implementations, drones 130 can be equipped with location tracking capability, e.g., GPS, such that drone location and movement can be updated on map 132 in real-time. Drones 130 can operate in an automatic/semi-automatic mode, where a human operator can guide/operate the drone 130 or provide instructions that can be executed by the drone 130 automatically. In one example, a human operator may provide a location for the drone 130 to explore.

Figure 2:
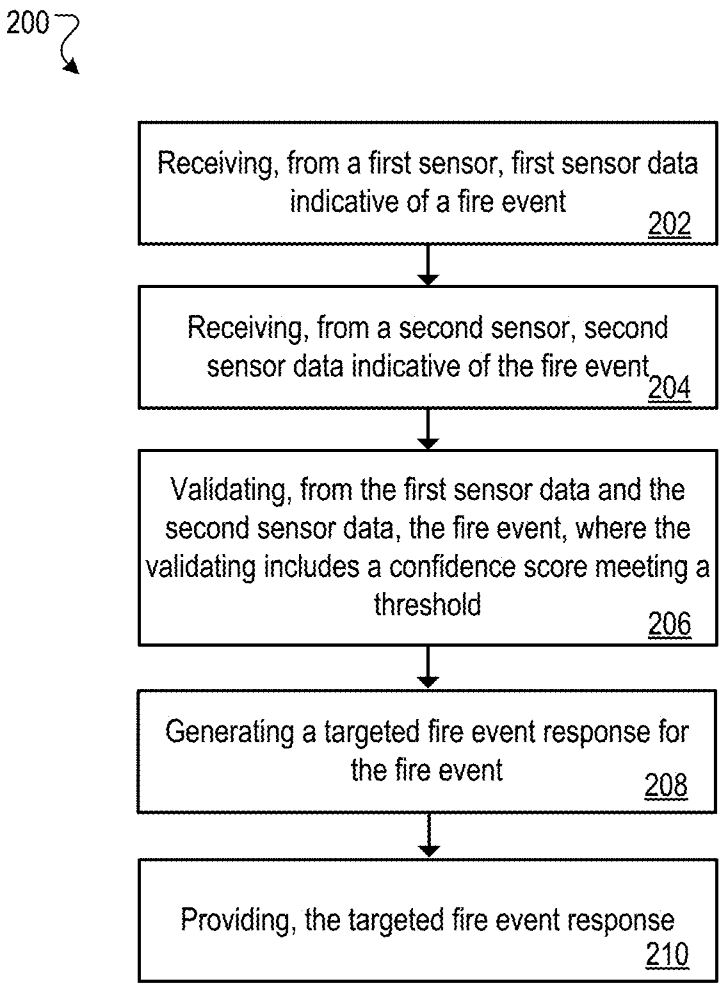
FIG. 2 is a flow diagram of an example process of a targeted response system.

FIG. 2 is a flow diagram of an example process of a targeted response system. First sensor data is received from a first sensor that is indicative of a fire event (202). First sensor data 112 can be received by the sensor data collection module 122, for example, from a first sensor 110 that is a smoke detector 111*a* located within sub-area 106*a*, where the first sensor data 112 includes an indication of the presence of smoke above a threshold amount in the vicinity of the smoke detector 111*a*. In some implementations, the first sensor data 112 can be provided by the smoke detector 111*a* to the targeted response system 102 after the amount of detected smoke exceeds a threshold amount. First sensor data 112 can alternatively be provided periodically by the smoke detector 111*a* to the targeted response system 102.

Second sensor data is received from a second sensor that is indicative of the first event (204). Second sensor data 112 can be received by the sensor data collection module 122, for example, from a second sensor 110 that is a camera 123*a* located within the sub-area 106*a* where a field of view of the camera 123*a* includes at least a portion of the sub-area 106*a*.

The second sensor data 112 includes imaging data captured by the camera 123*a* of the at least portion of the sub-area 106*a*. In some implementations, the second sensor data 112 can be provided by the camera 123*a* to the targeted response system 102 after the camera 123*a* determined, e.g., using image-processing software, that the imaging data captured includes an event 113 of interest in the scene, e.g., a fire. Second sensor data 112 can alternatively be provided periodically by the camera 123*a* to the targeted response system 102. In some implementations, the targeted response system 102 can request second sensor data 112 from second sensor 110 in response to receiving first sensor data 112 from first sensor 110, e.g., after receiving an indication of smoke from the smoke detector, the system may request imaging data from a camera located within a vicinity of the smoke detector.

The fire event is validated from the first sensor data and the second sensor data, where the validating includes a confidence score meeting a threshold (206). First sensor data and second sensor data indicative of an event 113 can be aggregated by the sensor data collection module 122 and provided to the event validation module 124. The event validation module 124 can assign a confidence score to the event 113 based in part on the aggregated sensor data. For example, if first sensor data 112 includes an indication from a smoke detector 111*a* that smoke is present in sub-area 106*a* and second sensor data 112 includes imaging data capturing flames from a camera 123*a*, then the event validation module 124, using pre-trained machine learned models, can assign a high confidence score, e.g., a rating of 9 out of 10. In another example, if a first sensor data 112 includes imaging data of a fire but the second sensor data 112 includes no indication of smoke present (which may indicate the fire is an image on a television screen), then the event validation module 124, using pre-trained machine learned models, can assign a low confidence score, e.g., a rating of 3 out of 10.

Validation of the event 113 can include the assigned confidence score meeting a threshold confidence score. For example, an event 113 with a low confidence score or a confidence score below a rating of 3 out of 10 may result in invalidating the event 113. In some implementations, an event 113 that is below the threshold confidence score may result in the targeted response system 102 to request additional sensor data 112 and/or request review from a human operator.

In some implementations, the event validation module 124 can assign a risk score to the validated event 113, e.g., based on a location of the event 113 within (or outside) the MDU 104 and a predictive modeling of how the event 113 will spread. The event validation module 124 can further reference one or more maps 132 including a layout of the MDU 104 and respective locations of fire-preventative measures, sensors 110, and statuses of various systems within the MDU 104, e.g., open/closed doors, security systems, etc. In one example, a fire event 113 in a common area 108 may be assigned a high risk score due to it being able to spread to many sub-areas 106 via open doorways. In another example, a fire event 113 located on a smart stovetop in a kitchen of a sub-area may be assigned a medium risk score due to its local nature and a status of a smart stovetop being off. In another example, a fire event may be assigned a high risk score due to the event validation module determining that multiple doors in proximity to the sub-areas included in the fire event are opened (thereby allowing the fire to potentially spread into other sub-areas).

In some implementations, fire-preventative measures, e.g., fire doors or automatically-triggered sprinklers, can result in the fire event being less likely to spread (e.g., being assigned a lower risk score) because of possible interventions being implemented. For example, for a system that automatically activates sprinklers and/or closes fire doors when a threshold smoke is detected, a lower risk score can be assigned to the fire event. In some implementations, the system can determine a likelihood of spread of the fire event (e.g., a risk score for the fire event) based on fire-preventative measures and room types of the sub-areas included in the fire event. For example, a kitchen equipped with automatically activated sprinklers may have a lower likelihood of spreading the fire event in the kitchen than a kitchen without sprinklers.

A targeted fire event response is generated for the fire event (208). The alert generation module 126 can receive the validated event 113 including an assigned risk score and determine a targeted fire event response. The targeted fire event response can include generating one or more alerts 136 to provide to user devices and/or to emergency responders. In one example, an alert 136 is a pop-up notification on the user device 142 that notifies the user of the event 113 and provides options to follow up, e.g., a map 132 including a safe, real-time evacuation route, and/or an option to provide feedback with respect to the event 113. In some implementations, an alert includes a map 132 that is updated with real-time sensor data 112 and risk scores to keep the user of the user device 142 aware of spread/containment of the event 113.

The targeted fire event response can include determining one or more counter measures to contain the event 113. In one example, a counter measure includes determining which of a subset of the sprinklers 120 are located within a threshold area surrounding the event 113. For example, the threshold area can include the sub-areas determined to be included in the fire event as well as an additional perimeter surrounding the sub-areas (e.g., an additional 20 foot perimeter surrounding the sub-areas, additional 10 foot perimeter, additional 25 foot perimeter, etc.). In another example, a counter measure includes determining a location that includes the event 113 to deploy a drone 130 to capture additional sensor data and/or provide localized counter measures, e.g., spray flame retardant on a fire from an onboard reservoir.

The targeted fire event response is provided (210). The targeted fire event response can be provided, for example, as an alert 136 to a user device 142 and as an alert to an emergency responder 134, e.g., a call to 9-1-1. The targeted fire event response can be provided, for example, as an activation of a subset of the sprinklers 120 that are determined to be located within a threshold area surrounding the event 113. The targeted fire event response can be provided, for example, as a deployment of a drone 130 to the determined location of the event 113.

Figure 3:
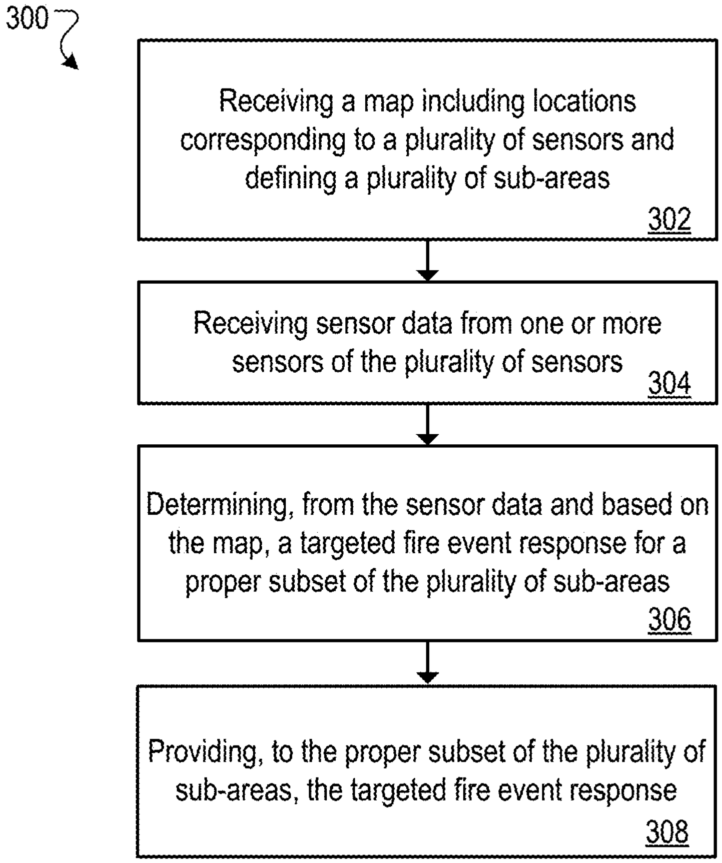
FIG. 3 is a flow diagram of another example process of the targeted response system.

In some implementations, an event 113 can be localized to a particular area of the MDU 104 such that different sub-areas 106 of the MDU can necessitate a different targeted response. In other words, a small kitchen fire may require a particular residence or set of residences to be evacuated while residences that are far away from the small kitchen fire may not require evacuation as long as the fire remains contained. FIG. 3 is a flow diagram of another example process of the targeted response system. A map including locations corresponding to multiple sensors and defining multiple sub-areas is received (302). A map 132 can be generated, for example, by an owner, a builder, property manager, resident, etc., and can be accessible by the targeted response system. The map can include a floor plan including the sub-areas 106 and locations of the sensors 110 in the MDU 104.

Sensor data is received from one or more sensors of the multiple sensors (304). Sensor data 112 indicative of an event 113 can be received from one or more sensors 110 located in the MDU 104, e.g., smoke detector data and imaging data from a smoke detector and camera, respectively. The sensor data 112 can be received from a group of sensors 110 that are all located within a threshold range of a particular sub-area 106 or sub-areas, e.g., all sensors can be located within or nearby a particular apartment.

A targeted fire event response is determined from the sensor data and based on the map for a proper subset of the multiple sub-areas (306). The targeted fire event response can be determined in part based on the locations of the sensors 110 that generated sensor data 112 indicative of the event 113. Map 132 can be utilized to determine which sensors of the set of sensors in the MDU 104 are generating sensor data 112 indicative of the event 113, e.g., detecting a possible fire, and which sensors of the set of sensors in the MDU 104 are not generating sensor data 112 indicative of the event, e.g., not detecting the possible fire. The subset of sub-areas of the multiple sub-areas can be determined to receive the targeted fire event response.

In one example, sensors 110 in an apartment located in a western wing of a large apartment complex can be detecting a fire in the kitchen of the apartment and sensors 110 in an adjacent apartment may also be detecting a possible fire, e.g., due to smoke coming out of shared ventilation. At the same time, sensors 110 in an apartment located in an eastern wing of the large apartment complex may not detect any possibility of the fire due to a large distance between the event 113 and a scale of the event 113. As such, only residents of the western wing of the apartment complex may receive a targeted fire event response, e.g., an alert 136. Moreover, emergency responders 134 can be alerted of a particular target area of the MDU 104 that includes the event 113 so that they can focus emergency response to the target area.

The targeted fire event response is provided to the proper subset of the multiple sub-areas (308). The targeted fire event response can be provided to the determined subset of sub-areas 106 of the multiple sub-areas of the MDU 104, e.g., an alert 136 can be provided to the residents of the subset of sub-areas 106. In some implementations, emergency responders 134 can receive a map 132 that highlights the subset of the multiple sub-areas 106 as target areas for emergency response.

Figure 4:
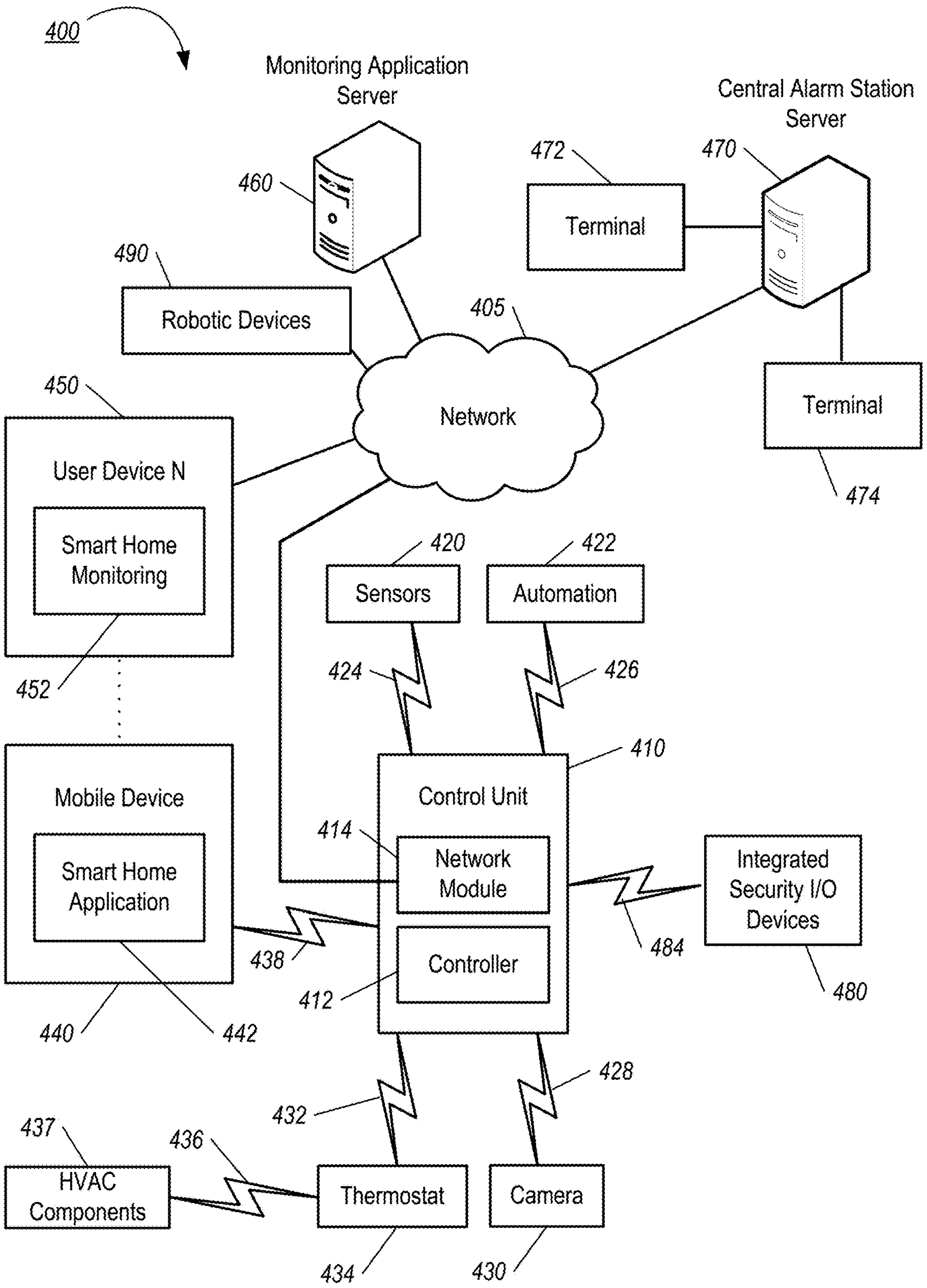
FIG. 4 shows a diagram illustrating an example home monitoring system.

In some implementations, providing the targeted fire event response includes determining occupancy states of each of the plurality of sub-areas, where determining an occupancy state for a sub-area includes collecting sensor data from a subset of sensors located at the sub-area and determining, from the collected sensor data, an occupancy confidence score, generating a real-time fire event map based occupancy confidence scores, and providing to one or more users, the real-time fire event map. For example, the alert generation module 126 may determine that there is a 90% confidence that a first apartment is occupied and a 0% chance that a second apartment is occupied and, in response, provide the emergency responders 134 a map 132 of the MDU 104 that indicates that the first apartment is likely occupied and the second apartment is not occupied. FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event 113. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400. For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor events generated by the control unit 410. In this example, the central alarm station server 470 may exchange communications with the network module 414 included in the control unit 410 to receive information regarding events detected by the control unit 410. The central alarm station server 470 also may receive information regarding events from the one or more user devices 440 and 450 and/or the monitoring server 460.

The central alarm station server 470 is connected to multiple terminals 472 and 474. The terminals 472 and 474 may be used by operators to process events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event 113 (e.g., the lock sensor data, the motion sensor data, the contact sensor data, etc.) and the operator may handle the alerting event 113 based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 442. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface, e.g., in the home monitoring application 442, that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event 113, such as an alarm event 113, a door-opening event 113 for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:

receiving, for a building comprising a plurality of sensors and a plurality of sub-areas comprising a first sub-area and a second sub-area and from a first sensor of the plurality of sensors located in the first sub-area, first sensor data indicative of an event in the second sub-area, wherein at least some sub-areas from the plurality of sub-areas are separated at least partially by a wall and the first sensor is from a plurality of sensors in the building;

in response to receiving the first sensor data indicative of the event in the building, receiving second sensor data from a second sensor of the plurality of sensors located in the second sub-area;

generating, using the first sensor data and the second sensor data, a targeted event response for the event; and providing, to each of one or more devices, instructions to cause the respective device to execute one or more actions for the targeted event response.

2. The method of claim 1, wherein the plurality of sensors comprise a sensor coupled to a drone.

3. The method of claim 2, further comprising:

transmitting, to the drone, instructions to cause the drone to move from a first position to a second position that is closer to the event than the first position; and receiving third sensor data from the drone located at the second position.

4. The method of claim 1, further comprising:

determining, using the second sensor data, a location of a person in the second sub-area, wherein generating the targeted event response for the event uses the location of the person.

5. The method of claim 4, wherein receiving the second sensor data comprises receiving data representing the person that was collected without physically contacting the person.

6. The method of claim 1, further comprising determining, using the second sensor, an occupation level within the second sub-area, wherein generating the targeted event response for the event uses the occupation level within the second sub-area.

7. The method of claim 1, further comprising maintaining data for the building that indicates physical locations of objects within the building, wherein generating the targeted event response for the event uses the data for the building that indicates the physical locations of the objects.

8. The method of claim 1, wherein the first sensor is an infrared camera.

9. A system comprising one or more computers and one or more storage devices on which are stored instructions that are operable, when executed by the one or more computers, to cause the one or more computers to perform operations comprising:

receiving, for a building comprising a plurality of sensors and a plurality of sub-areas comprising a first sub-area and a second sub-area and from a first sensor of the plurality of sensors located in the first sub-area, first sensor data indicative of an event in the second sub-area, wherein at least some sub-areas from the plurality of sub-areas are separated at least partially by a wall and the first sensor is from a plurality of sensors in the building;

in response to receiving the first sensor data indicative of the event in the building, receiving second sensor data from a second sensor of the plurality of sensors located in the second sub-area;

generating, using the first sensor data and the second sensor data, a targeted event response for the event; and providing, to each of one or more devices, instructions to cause the respective device to execute one or more actions for the targeted event response.

10. The system of claim 9, wherein the plurality of sensors comprise a sensor coupled to a drone.

11. The system of claim 10, wherein the operations further comprise:

transmit, to the drone, instructions to cause the drone to move from a first position to a second position that is closer to the event than the first position; and receive third sensor data from the drone located at the second position.

12. The system of claim 9, wherein the operations further comprise:

determining, using the second sensor data, a location of a person in the second sub-area, wherein generating the targeted event response for the event uses the location of the person.

13. The system of claim 12, wherein receiving the second sensor data comprises receiving data representing the person that was collected without physically contacting the person.

14. The system of claim 9, wherein the operations further comprise:

determining an occupation level within the second sub-area, wherein generating the targeted event response for the event uses the occupation level within the second sub-area.

15. The system of claim 9, wherein the operations further comprise:

maintaining data for the building that indicates physical locations of objects within the building, wherein generating the targeted event response for the event uses the data for the building that indicates the physical locations of the objects.

16. The system of claim 9, wherein the first sensor is an infrared camera.

17. A non-transitory computer storage medium encoded with instructions that, when executed by one or more computers, cause the one or more computers to perform operations comprising:

receive, for a building comprising a plurality of sensors and a plurality of sub-areas comprising a first sub-area and a second sub-area and from a first sensor of the plurality of sensors located in the first sub-area, first sensor data indicative of an event in the second sub-area, wherein at least some sub-areas from the plurality of sub-areas are separated at least partially by a wall and the first sensor is from a plurality of sensors in the building;

in response to receiving the first sensor data indicative of the event in the building, receive second sensor data from a second sensor of the plurality of sensors located in the second sub-area;

generate, using the first sensor data and the second sensor data, a targeted event response for the event; and provide, to each of one or more devices, instructions to cause the respective device to execute one or more actions for the targeted event response.

18. The non-transitory computer storage medium of claim 17, wherein the plurality of sensors comprise a sensor coupled to a drone.

19. The non-transitory computer storage medium of claim 18, wherein the operations further comprise:

transmit, to the drone, instructions to cause the drone to move from a first position to a second position that is closer to the event than the first position; and receive third sensor data from the drone located at the second position.

20. The non-transitory computer storage medium of claim 17, wherein the operations further comprise:

determining, using the second sensor data, a location of a person in the second sub-area, wherein generating the targeted event response for the event uses the location of the person.

* * * * *